Patented Apr. 16, 1929.

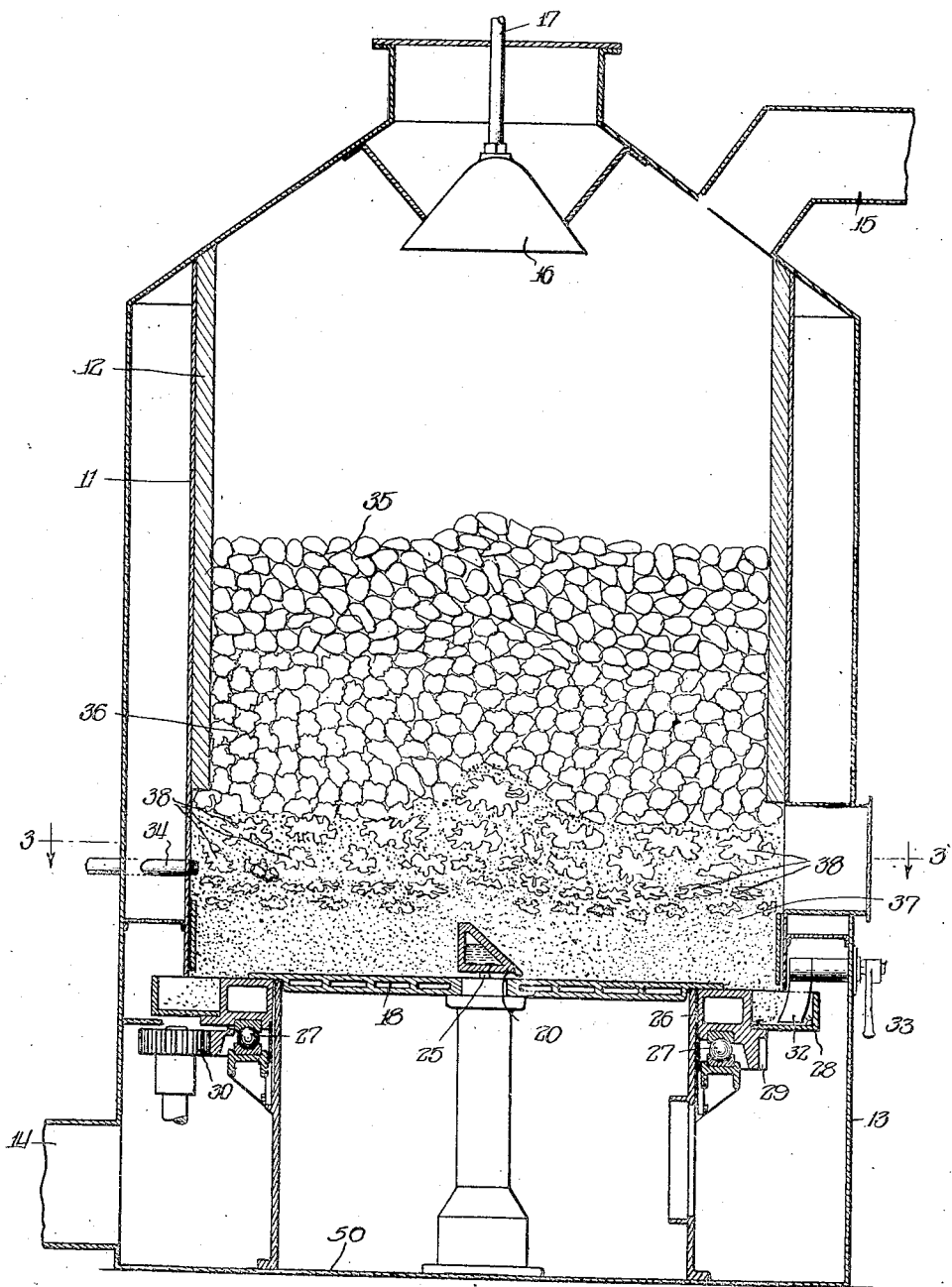

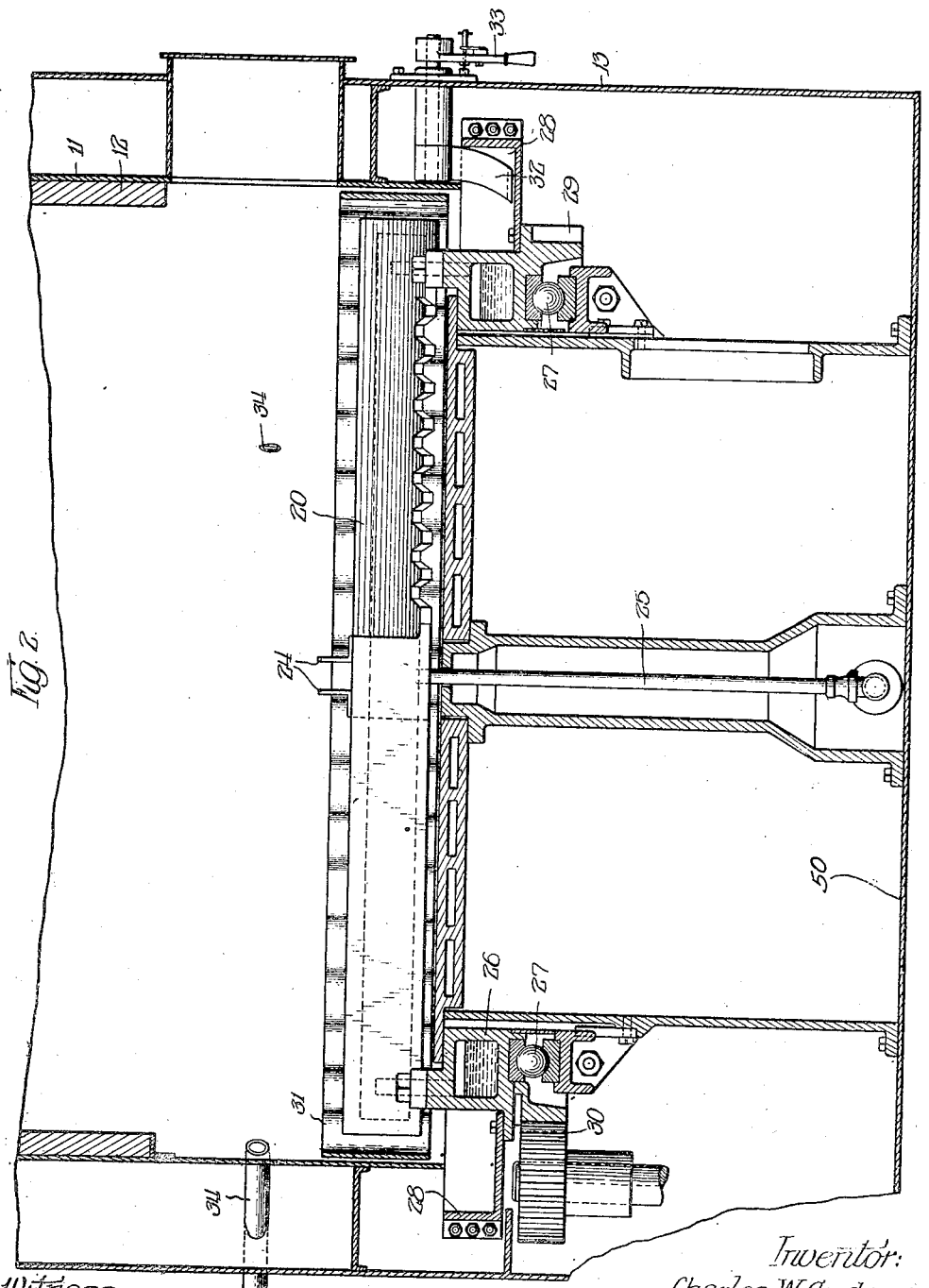

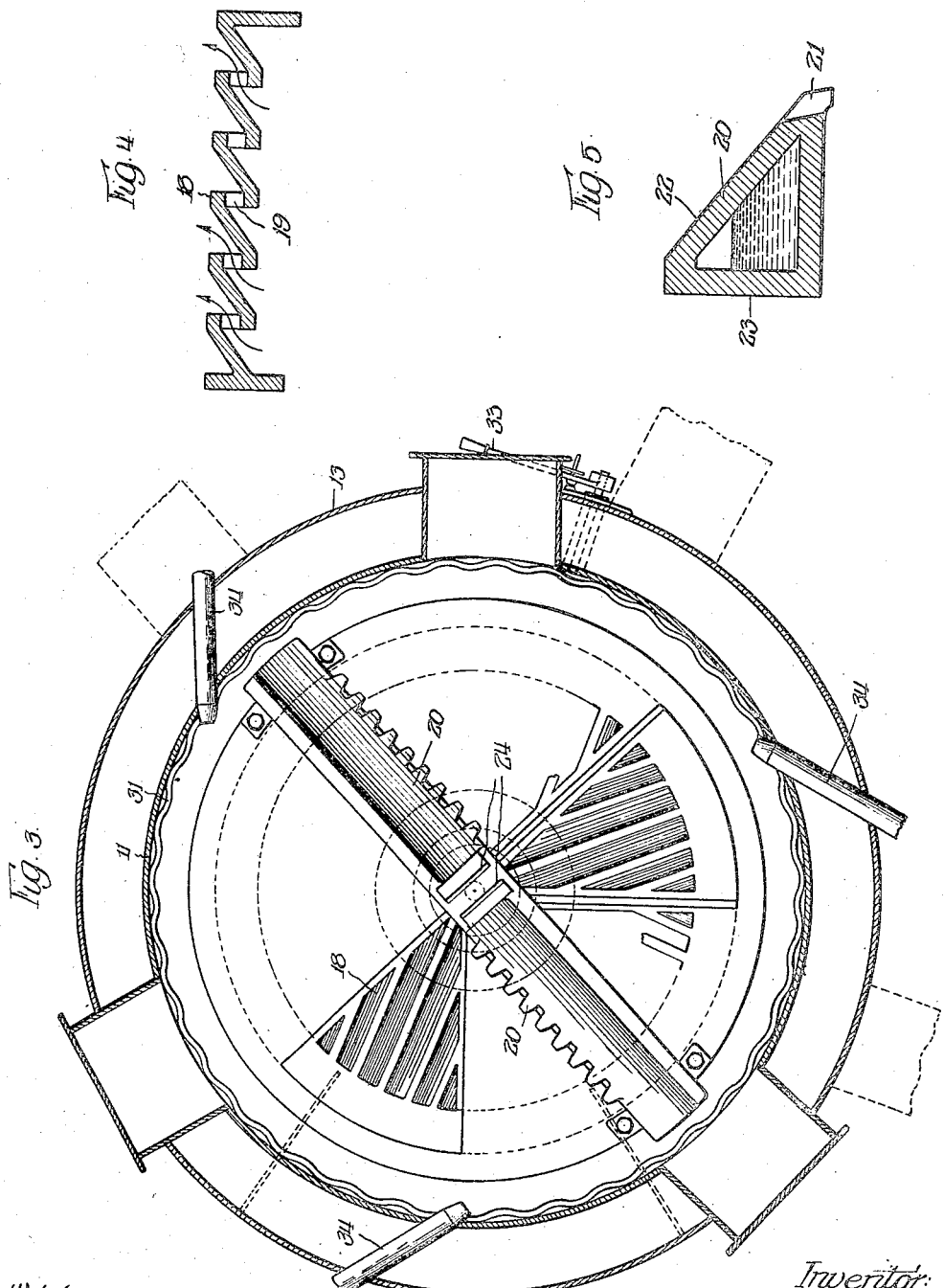

1,709,107

UNITED STATES PATENT OFFICE.

CHARLES W. ANDREWS, OF DULUTH, MINNESOTA.

METHOD OF MAKING WATER GAS.

Application filed January 8, 1925. Serial No. 1,157.

This invention relates to a new and improved method of making water gas, and more particularly to a method which comprises treating the fuel and ash masses in a dry bottom water gas generator in such manner as to break up clinkers and to insure substantially uniform permeability throughout the mass.

In water gas generators as heretofore used, the effective horizontal area of the generators is limited by the presence of large masses of clinker, which makes the bed less permeable and results in the channeling of the air or steam in their upward course. These gases tend to channel adjacent the walls, and the clinker tends to cake in the center of the gas generator. This channeling and lessening of effective area results in the lessening of the capacity of the generator and also results in the deterioration of the quality of the gas, due to the fact that the channels permit the passage of undecomposed steam during steam blasting, and air during air blasting. This results, in the case of water gas, in an increased $CO_2$ content.

All the above difficulties are obviated in my invention by the agitation of the fuel bed in a dry bottom water gas generator from the bottom up and from the center to the walls.

By this general agitation, I have found that a uniform permeability of the fuel bed is obtained. It no longer is true that the perimeter of the fire bed is the most active zone and it, therefore, becomes possible and desirable to admit a portion of air at the walls as well as through the bottom. The amount of air admitted at the walls I preferably control by suitable valves so that it can be increased or decreased according to the condition of the fire, the heat losses through the walls and other operating conditions. The air admitted through the central portion of the fire can be through a tuyère head or a somewhat restricted grate area or both. The application of a portion of the air at the walls has made it possible to bring in this air at a level as much above the ash zone as desired, thereby furnishing the maximum amount of heat at the most desirable zone of the generator and keeping the ash zone at a relatively low temperature. In other words, the permeability which has been reached through the breaking up of the clinker by a general and complete agitation of the fire results in the presentation of a large surface of ash and broken clinkers which have been heated by the passage of gases or combustion of intermixed coke and which is then capable of giving up its absorbed heat in accordance with the principles of regeneration.

In the case of water gas practice the amount of $CO_2$ produced is, among other factors, dependent directly upon the fire temperature and results in lower $CO_2$ content, as well as increased production.

I have illustrated in the accompanying drawings one form of construction adapted for carrying out my improved method.

In the drawings,—

Figure 1, is a vertical section of the water gas generator;

Figure 2, is a view similar to Figure 1, on a larger scale, showing the details of construction of the generator;

Figure 3, is a horizontal section taken on the line 3—3 of Figure 1 omitting the fuel;

Figure 4, is an enlarged vertical section showing the grate construction, and

Figure 5, is an enlarged vertical section showing the rotating bar.

Referring first to Figure 1, the generator comprises the shell 11 and the refractory lining 12, which may be omitted if more steam is desired or clinkers form unduly. The water jacket formed between the inner and outer portions of the shell 11 absorbs heat for the production of this steam and it will be noted from Figure 1, that the refractory lining 12 does not extend down over the zone of formation of clinkers 38 which is also the zone of clinker adhesion. The bottom of the generator is entirely enclosed by the walls 13 so as to render it an air-tight structure. The purpose of the air-tight closed bottom 50 is to permit sufficient pressure to be carried in the gas unit to force the gas produced to the desired point of use. The passage 14 is provided for the introduction of air and steam at the lower end of the gas generating chamber, and the upper end of the unit is provided with the gas outlet passage 15. The upper end of the generator is also provided with the charging bell 16, supported by a hanger 17. The central portion of the bottom of the unit is closed by the grates 18, which consist of a plurality of sections, as best shown in Figure 3. An enlarged section is shown in Figure 4, the passages 19 through the grates permitting the flow of air or steam and minimizing the downward passage of ashes. It will be understood that the rotating bar 20, shown in Figures 1, 3 and 5, moves over the grate section shown in Figure 4 from left to right. There is consequently no tendency for the bar to force ashes down through the grate. The bar 20 is provided with the teeth 21 at its forward edge, and its forward face 22 slopes upwardly upon an angle. The rear face 23 is vertical, to insure a sharp drop off of the material. The bar may be provided with upstanding angle irons 24 upon its central portion, as shown in Figure 2, these bars serving to agitate the material at that point. The bar is shown in Figure 2 as supplied with cooling water through the pipe 25. The outer ends of the bar 20 are secured to the ring 26, which rotates on ball bearings 27. This ring also carries the ash pan 28. The ring 26 is provided with gear teeth 29, meshing with the gear 30, which may be driven by any suitable source of power. The interior of the generator is provided with the vertically corrugated wear-plate 31, located adjacent the outer ends of the bar 20. This plate cooperates with the ends of the bar to break up clinkers which may be thrown out by the rotary movement. Ashes are removed from the ash pan 28 by means of the shiftable scoop 32, which may be regulated as to depth of ash ejection by means of the handle 33. As best shown in Figure 3, the apparatus is provided with a plurality of approximately tangential tuyères 34. As shown in Figures 1 and 2, these tuyères are located above the grate and at a level substantially that of the normal ash line in the operation of the apparatus.

The generator is shown in Figure 1 as filled with a mass of fuel and ashes, as in the normal operation for completely gasifying coal. The upper portion 35 of the mass of fuel consists in raw coal lately deposited in the gas generating chamber, below that is a thick bed 36 of fuel which has been coked, below which is the layer 37, consisting mainly of large clinkers and ashes, with some small amount of unburnt coke. The formation of the clinkers 38 in large masses takes place approximately at the top of the ash bed. The action which the rotating bar has upon the bed of ashes and fuel is clearly shown in Figure 1. The lifting effect extends vertically through the beds and is not felt merely at the lower portion. This thorough agitation usually renders unnecessary top stirring to prevent caking of the fuel as it is coked. Obviously the process may be carried out by charging coke rather than coal, if desired.

The sloping forward face of the bar gradually lifts the bed in the generator, but there is a sharp drop off at the rear which is important in its breaking effect upon the large clinkers formed. These are broken up by their contact with each other upon this lift and sudden drop. It has been found in practice that very small clinkers only are discharged from the generator. The rate of discharge may be regulated by the amount of ashes scooped out of the circular ash pan 28 by the shiftable scoop 32. Only a relatively small portion of ash passes down through the grate.

In the operation air and steam are supplied alternately through passage 14 and pass up through the grates and fuel bed, thereby generating air blast gas and water gas alternately. Due to the permeability afforded by the agitation this flow is substantially uniform over the grate area. An additional flow may be introduced through the tuyères 34 at the top of the ash level. When air blasting air introduced at this point may burn with the blast gas formed by the air from the grate passing through the ashes and the coke contained in the ashes. A very high temperature is thus secured in the combustion zone of the fuel mass.

While one form of apparatus particularly adapted for carrying out my process has been shown in the accompanying drawings, it is to be understood that it may be carried out by other apparatus and I contemplate such changes and modifications as come within the spirit and scope of the appended claims.

I claim:

1. The method of making water gas from a fuel bed in a dry bottom closed chamber having a stationary grate, which comprises alternately air and steam blasting the fuel bed, maintaining upper fuel zones, an intermediate clinker formation zone and a lower ash zone, water cooling the walls of said clinker formation zone, and breaking up large masses of clinkers which form by grinding the clinkers against each other and against the walls of the chamber by means of up and down agitation of the fuel and ash beds and continuous agitation of the ash bed from the center outward.

2. The method of making water gas from a fuel bed in a dry bottom closed chamber having a stationary grate, which comprises alternately air and steam blasting the fuel bed, maintaining upper fuel zones, an intermediate clinker formation zone and a lower ash zone, water cooling the walls of said clinker formation zone, and in said lower zone breaking up large masses of clinkers which form by means of bottom agitation of the fuel and ash beds and agitation of the ash bed from the center outward, and removing ashes continuously from the ash bed, the rate of said ash removal being independent of the agitation of the mass.

Signed at Duluth, Minn., this 30th day of December, 1924.

CHARLES W. ANDREWS.